United States Patent
Epstein

(10) Patent No.: US 6,857,187 B2
(45) Date of Patent: Feb. 22, 2005

(54) METHOD OF MANUFACTURING A MEASURING WHEEL FOR WIRELINE OPERATIONS

(76) Inventor: Jeffrey S Epstein, 1015 Redcedar La., Houston, TX (US) 77094

( * ) Notice: Subject to any disclaimer, the term of this patent is extended or adjusted under 35 U.S.C. 154(b) by 18 days.

(21) Appl. No.: 10/613,158

(22) Filed: Jul. 3, 2003

(65) Prior Publication Data

US 2005/0000106 A1 Jan. 6, 2005

(51) Int. Cl.$^7$ .............................................. B21D 53/26
(52) U.S. Cl. ..................... 29/894; 29/894.2; 29/895.21; 29/402.06; 29/402.08; 29/402.18; 33/778; 474/190
(58) Field of Search ................................ 29/894, 894.2, 29/895.1, 895.2, 895.21, 402.06, 402.08, 402.18, 402.19; 33/772, 778; 474/166, 190; 254/390; 428/1, 28

(56) References Cited

U.S. PATENT DOCUMENTS

| | | | | |
|---|---|---|---|---|
| 2,876,549 A | * | 3/1959 | Adamson et al. | .............. 33/734 |
| 3,318,165 A | * | 5/1967 | McAleer et al. | ............ 474/192 |
| 3,329,931 A | * | 7/1967 | Tanguy | ......................... 367/64 |
| 3,393,589 A | * | 7/1968 | Mills | .............................. 83/13 |
| 3,861,012 A | * | 1/1975 | Spaeder, Jr. | .................... 492/3 |
| 4,089,371 A | | 5/1978 | Decuir, Sr. | |
| 4,117,600 A | | 10/1978 | Guignard et al. | |
| 4,469,171 A | | 9/1984 | Mine | |
| 4,718,168 A | | 1/1988 | Kerr | |
| 4,899,816 A | | 2/1990 | Mine | |
| 5,019,978 A | | 5/1991 | Howard, Jr. et al. | |
| 5,322,019 A | | 6/1994 | Hyland | |
| 5,351,531 A | | 10/1994 | Kerr | |
| 5,926,024 A | | 7/1999 | Blount et al. | |
| 6,375,163 B1 | | 4/2002 | Carlson et al. | |
| 2004/0128851 A1 | * | 7/2004 | Brown | ......................... 33/772 |

OTHER PUBLICATIONS

Ceramic Technologies Inc, "Solid Ceramic IDW Measuring Wheel",Brochure, Sep. 1996.

* cited by examiner

*Primary Examiner*—Eric Compton
(74) *Attorney, Agent, or Firm*—Streets & Steele; Jeffrey L. Streets; Steven L. Christian

(57) ABSTRACT

A method of manufacturing a measuring wheel for wireline operations includes the step of machining a metal wheel to achieve a first outer radius. The metal wheel is positioned within a ceramic ring having an inner radius that exceeds the first outer radius by an amount in the range of 0.005 to 0.010 inches, defining a gap between the ceramic ring and the metal wheel. The gap is substantially filled with a suitable epoxy, and the epoxy is cured to adjoin the ceramic ring to the metal wheel. The perimeter of the ceramic ring is machined to achieve a second outer radius and a desirable surface finish and pattern.

15 Claims, 4 Drawing Sheets

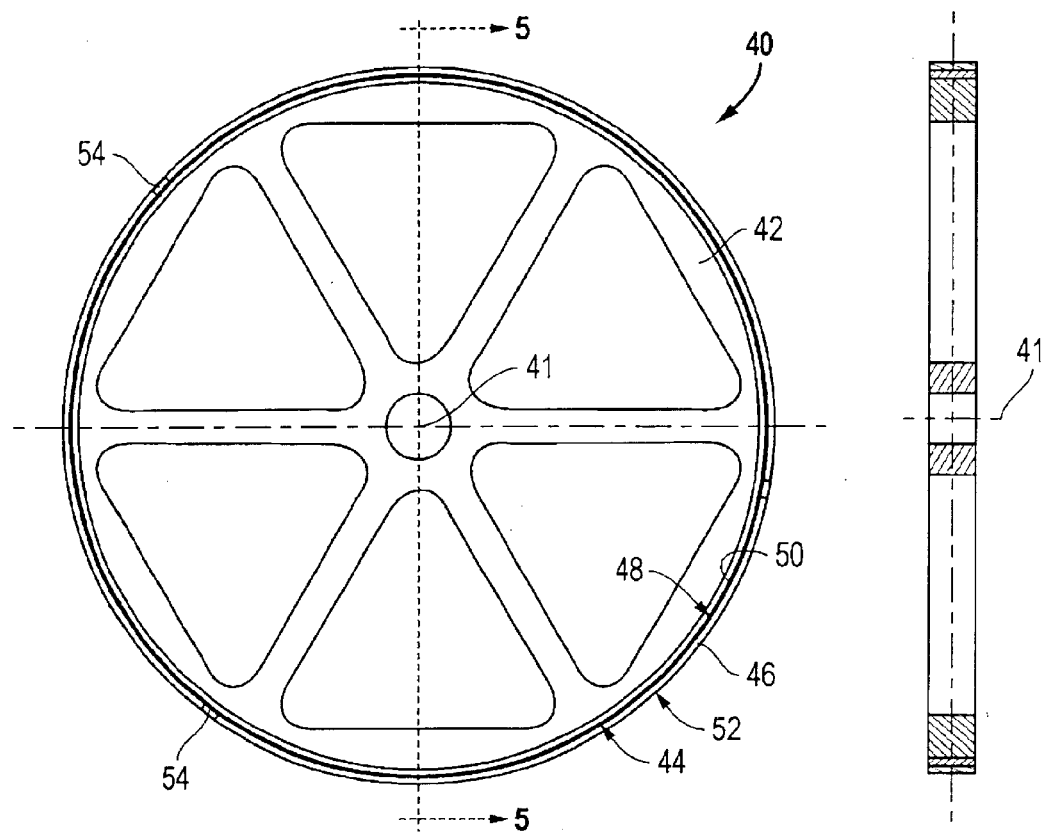
*FIG. 4*     *FIG. 5*
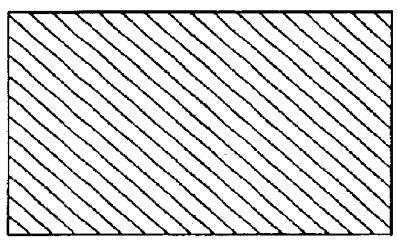
*FIG. 6*

METHOD OF MANUFACTURING A MEASURING WHEEL FOR WIRELINE OPERATIONS

BACKGROUND OF THE INVENTION

1. Field of the Invention

The present invention relates to measurement of deployed cable lengths, and, more particularly, to measuring wheels for indicating the depth of a wellbore logging tool deployed on an armored cable known as a wireline.

2. Background of the Related Art

Hydrocarbon exploration and drilling operations commonly employ logging tools for interrogating subsurface formations intersected by a wellbore. As shown in FIG. 1, a logging tool 2 is positioned in a wellbore 4 using an armored cable known in the art as a wireline 6. Typically, a wireline is connected at one end to a logging tool 2 and connected at its other end to a spooling winch 8 positioned at the surface of the land or body of water overlying the subsurface formation F of interest. The spooling winch 8 is used to control the movement of the wireline 6, and thus the logging tool 2, into and of the wellbore 4. The data obtained by a logging tool is specific to the depth at which the logging tool is positioned when the data is collected. It is therefore essential to continuously determine the depth of the logging tool while the tool is collecting wellbore data.

It is well know in the relevant art to determine the depth of a logging tool 2 by measuring the length of the wireline 6 supporting the tool, particularly the length of wireline extending from the deployment surface (land or water) to the logging tool. Measurement of this length is typically accomplished with a mechanical wheel system, sometimes in combination with a magnetic marking system. The mechanical wheel system employs a measuring wheel 9 having a calibrated outer radial surface, or perimeter, over which the wireline is at least partially wrapped. The frictional engagement between the wireline and the measuring wheel's perimeter results in rotation of the measuring wheel as the wireline is moved into and out of the wellbore by the spooling winch. Revolutions of the measuring wheel are counted and correlated to depth using the circumference of the measuring wheel, and recorded and/or displayed on a visual indicator.

Measuring wheels of this sort are currently made of stainless steel, Invar or some other metal that are chosen for their resistance to physical change during operations, because the physical dimensions of the wheel—particularly the radius—directly affect the determined wireline depth. Thus, characteristics such as low coefficient of thermal expansion and high toughness are desirable. Low magnetism (i.e., nonmagnetic) characteristics are further desirable to avoid interference with logging tools that sense magnetic properties of the subsurface formations.

Known measuring wheels must be frequently replaced or refurbished due to wear caused by movement and nibbing of the wireline over the measuring wheel before and after frictional engagement between the two. The calibration between the measuring wheel's outer radius and its indicated depth is very sensitive to wear: even a reduction of 0.001 inches in the radius of the measuring wheel will significantly affect the accuracy of the resulting depth indication. Since depth determination of a well logging tool is critical in identifying the location of subsurface hydrocarbon formations, wear by the measuring wheel can contribute to a laterally steered wellbore missing a desirable formation.

Wear of a measuring wheel's perimeter also permits slippage between a wireline and the measuring wheel, further adversely affecting depth determination.

U.S. Pat. Nos. 5,351,531; 4,718,168; and 4,117,600 disclose typical uses of measuring wheels in wireline systems, but are directed to supplemental systems for improving the accuracy of the depth indication provided with measuring wheels, and fail to address the above-noted wear issue.

It is therefore desirable to provide a measuring wheel that is more resistant to wear than known measuring wheels, whereby the reliable service life of the measuring wheel is increased.

It is further desirable to make the perimeter of a measuring wheel more resistant to slippage by a wireline wrapped at least partially over the perimeter.

It is further desirable to provide a method for refurbishing a spent measuring wheel in a manner that improves the measuring wheels wear resistance and slippage resistance, as opposed to discarding the spent measuring wheel in favor of a newly fabricated measuring wheel.

SUMMARY OF THE INVENTION

The present invention provides a method of manufacturing a measuring wheel for wireline operations. The method begins with the machining of a metal wheel to achieve a first outer radius. The metal wheel is positioned within a ceramic ring having an inner radius that exceeds the first outer radius by an amount in the range of 0.005 to 0.010 inches, defining a gap between the ceramic ring and the metal wheel. The gap is substantially filled with a suitable epoxy, and the epoxy is cured to adjoin the ceramic ring to the metal wheel. The perimeter of the ceramic ring is machined to achieve a second outer radius.

The metal wheel may be part of a spent measuring wheel, or it may be newly fabricated. In the former case, the first outer radius is achieved by machining the perimeter of the spent measuring wheel part to eliminate nonuniform areas produced by wear. Experience suggest that the perimeter of the spent measuring wheel part is preferably machined to reduce its outer radius by an amount in the range of 0.060 to 0.100 inches.

In a particular embodiment, the step of machining the perimeter of a metal wheel. achieves a surface finish at the perimeter of the metal wheel in the range of 32 to 125 rms.

It is preferred that the ceramic ring of the measuring wheel includes one of zirconium oxide, aluminum oxide, and silicon nitride.

It is further preferred that the epoxy used to adjoin the ceramic ring and the metal wheel is electrically insulating and has a relatively high coefficient of thermal expansion. The epoxy is preferably curable at standard temperature and pressure for a period of twenty-four hours.

In a particular embodiment, the step of machining the perimeter of the ceramic ring achieves a surface finish at the perimeter of the ceramic ring in the range of 32 to 64 rms.

It is further preferred that the step of machining the perimeter of the ceramic ring achieves a patterned surface finish at the perimeter of the ceramic ring.

It is further preferred that the inventive manufacturing method includes the step of adding a wear indicator to the perimeter of the ceramic ring. Preferably, the step of adding the wear indicator includes the steps of forming at least one groove across the perimeter of the ceramic ring, the groove having a depth corresponding to acceptable wear of the ceramic ring and being substantially parallel to the axis of the ceramic ring, and applying a dye to the bottom of the groove, such that wear of the ceramic ring exceeding the depth of the groove will be indicated by the elimination of the dye. In a particularly preferred embodiment, the depth of the groove is approximately 0.010 inches and the groove is approximately 0.125 inches wide. It is further preferred that three such grooves be formed across the perimeter of the ceramic ring, 120 degrees apart.

The present invention further provides a measuring wheel for use in wireline operations. The inventive measuring wheel includes a metal wheel having a first outer radius, and a ceramic ring having an inner radius that exceeds the first outer radius by an amount in the range of 0.005 to 0.010 inches, defining a gap between the ceramic ring and the metal wheel when the two are concentrically arranged. The ceramic ring has a perimeter whose surface employs a patterned machined finish for improving the frictional engagement between the perimeter of the ceramic ring and a wireline, and a wear indicator. An epoxy is disposed in the gap for adjoining the ceramic ring to the metal wheel.

In a particular embodiment, the wear indicator of the ceramic ring includes at least one groove having a depth corresponding to acceptable wear of the ceramic ring and being substantially parallel to the axis of the ceramic ring. It is preferred that a dye be applied to the bottom of the groove, such that wear of the ceramic ring exceeding the depth of the groove will be indicated by the elimination of the dye.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a side view of the measuring wheel of FIG. 3.

FIG. 5 is an edge view of the measuring wheel of FIG. 3.

FIG. 6 is an enlarged view of a portion of the perimeter surface of the measuring wheel of FIG. 3.

DETAILED DESCRIPTION OF THE INVENTION

Figure 1:
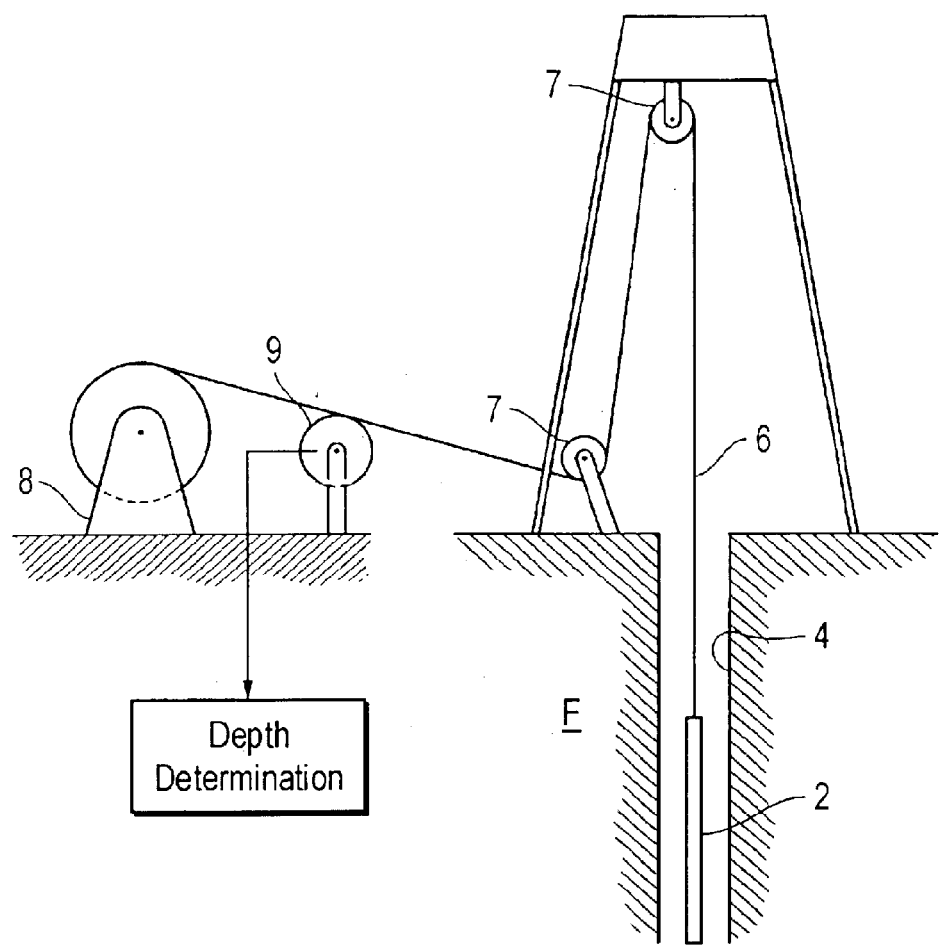
FIG. 1 is a simplified elevational view of a wireline operation in accordance with the general teachings of the prior art.
Figure 2:
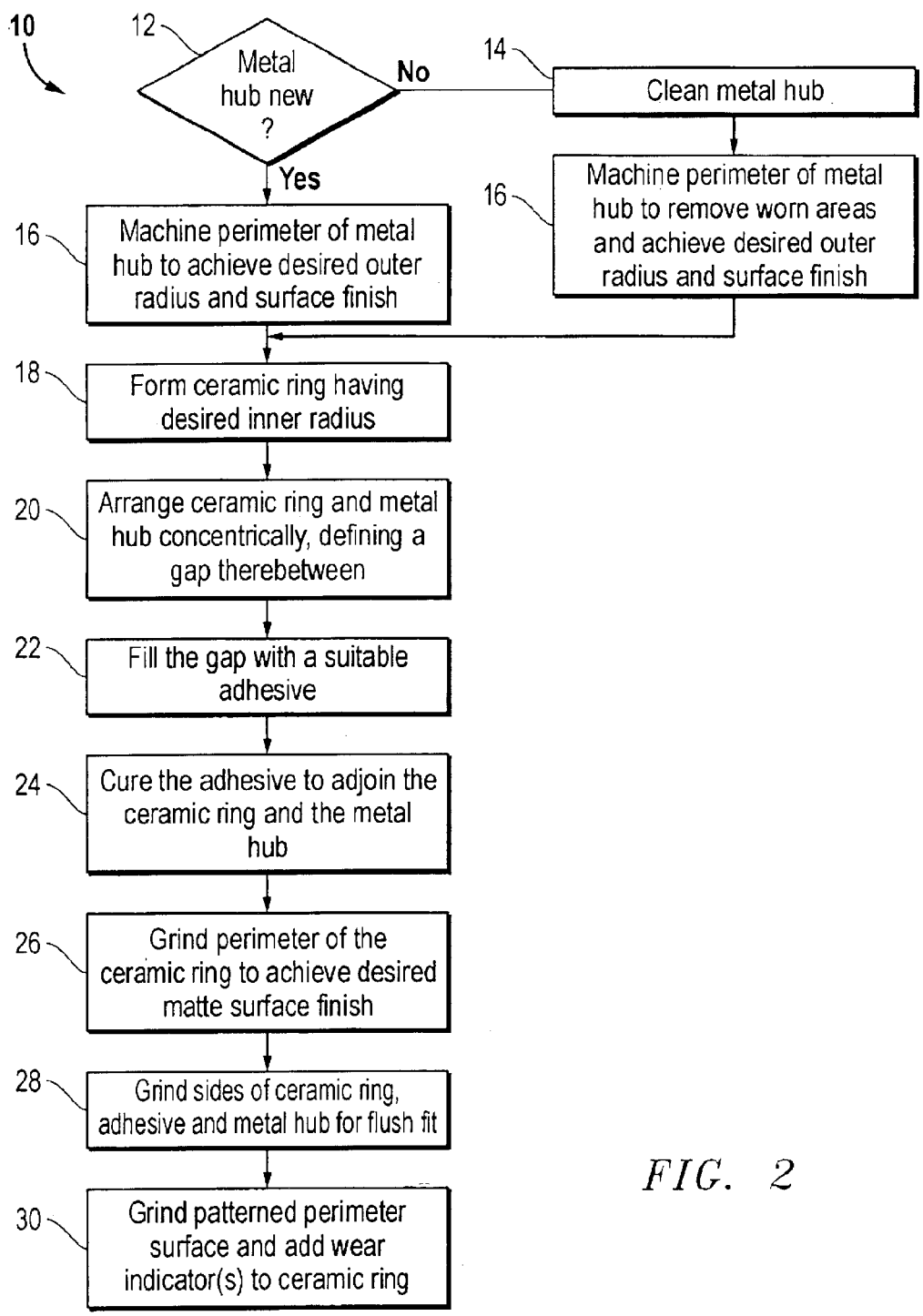
FIG. 2 is a flow chart depicting a method of manufacturing a measuring wheel in accordance with one aspect of the present invention.
Figure 3:
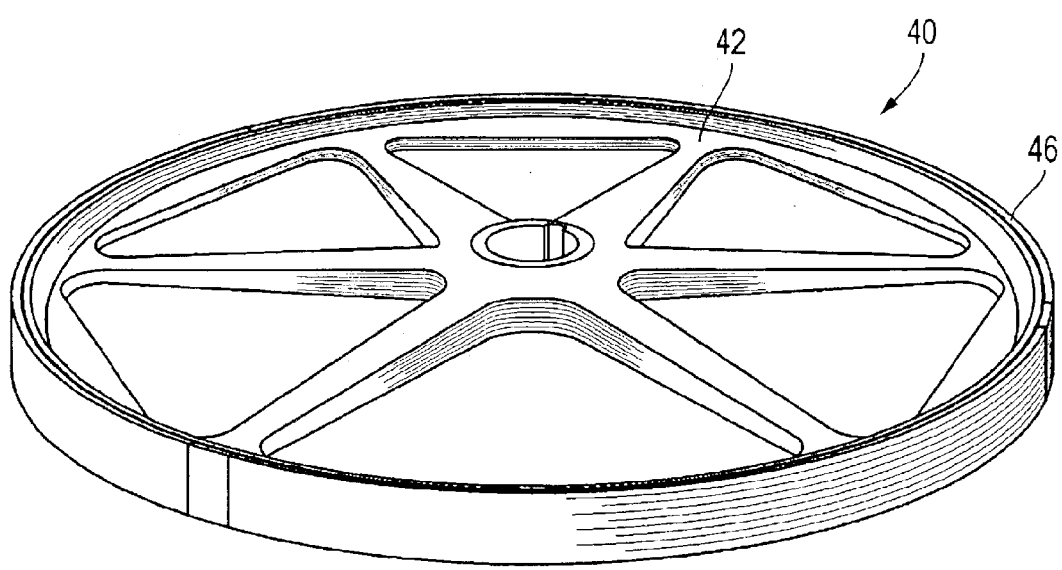
FIG. 3 is a perspective view of a measuring wheel in accordance with another aspect of the present invention.

The present invention provides a method of manufacturing a measuring wheel for wireline operations. A presently preferred embodiment of the inventive method 10 will now be described with reference to the flow chart depicted in FIG. 2, as well as the various measuring wheel views of FIGS. 3–6. Because the method is applicable to new or spent measuring wheels, an initial decision point 12 requires determination of whether the metal wheel component 42 of the measuring wheel 40 is new. Metal wheels make up the entire measuring wheel in many of the present commercial offerings, and are often discarded when a radial groove or other wear depth exceeding 0.010 inches is detected. The present invention provides a means for effectively refurbishing worn or spent measuring wheels, as opposed to merely fabricating an entirely new measuring wheel. If the metal wheel is not new (i.e., the measuring wheel is being refurbished), the metal wheel must first be cleaned (block 14). Then, the outer radial surface, or perimeter 44 of the metal wheel 42, is machined to remove worn areas and achieve a desirable outer radius and surface finish (block 16).

The machining eliminates uneven areas, such as grooves, in the metal wheel's perimeter 44 caused by wear from a wireline. Typical wear depth for a spent measuring wheel 40 is 0.010 inches or greater. Thus, machining (i.e., grinding) the radius down by an amount in the range of 0.060 to 0.100 inches will be adequate to remove the worn areas in substantially all spent measuring wheels, and thereby achieve a desirable outer radius for the metal wheel 42. A surface finish of 125 rms is particularly preferred on the perimeter of the metal wheel 42, although surface finishes in the range of 32–125 rms will produce desirable results.

Next, a ceramic cylinder 46 is pressed and fired (block 18) in a manner that is known in the art, for use as a rim for the measuring wheel 40. It is presently preferred that the cylinder be fabricated of a zirconium oxide ceramic material, but aluminum oxide and silicon nitride are also suitable candidate materials.

The inner radius of the ceramic cylinder, indicated at 48 in FIG. 4, is carefully formed to nearly match the outer radius of the metal wheel, indicated at 44. The inner radius of the ceramic cylinder is then machined by diamond grinding to leave a radial gap in the range of 0.005 to 0.010 inches, and more preferably 0.006 to 0.007 inches, between the metal wheel 42 and the ceramic ring 46. The width of the ceramic ring 46 is also carefully formed to nearly match the width of the metal wheel 42.

The zirconium oxide ceramic ring 46 provides a very high hardness and good toughness to the measuring wheel 40. These properties enables the inventive measuring wheel 40 to last at least 2–3 times longer than conventional measuring wheels that are composed only of metal wheels, without showing measurable wear. Testing has also indicated that the ceramic ring 46 experiences 40% less slippage compared to conventional measuring wheels.

The use of such a solid ceramic rim 46 also produces a more reliable measuring wheel which needs less calibrating. Measuring wheels often have to be taken out of service and sent to a repair facility to recalibrate them. Recalibration is necessary so the wireline depth determinations can be reliably based on the actual diameter of the measuring wheel. Because the ceramic-rimmed measuring wheels 40 wear significantly less than conventional metal-only measuring wheels, the reliability of the depth determinations is increased and the frequency of required recalibration is reduced.

Ceramic-lined measuring wheels further provide a non-magnetic characteristic that is important in wellbore logging operations. Often, a magnetic marking system is employed in logging operations to help compensate for inevitable stretching that occurs in a wireline. Small regions of the wireline are encircled with a "magnetic mark" at spaced intervals (e.g., every 25 feet) along the length of the wireline. As the wireline travels into and out of the wellbore, sensors near the mouth of the wellbore record the passage of the magnetic marks. A conventional, metal-only measuring wheel can inadvertently impose heavy magnetic "stray" marks on the wireline. These stray marks can be misread by the magnetic sensors as the deliberate marks, causing uncertainty for a logging engineer trying to compensate for the stretch in the wireline. The non-magnetic nature of the ceramic ring 46 eliminates these stray marks on the wireline, thereby promoting accurate wireline stretch determination.

Once the ceramic ring 46 is formed, the metal wheel 42 is positioned within the ceramic ring 46 in a concentric manner, defining a 0.006 to 0.007 inch gap, in a preferred embodiment, between the ceramic ring and the metal wheel (block 20). The gap is substantially filled with a suitable epoxy (block 22) to bond the ceramic ring to the metal wheel. Other bonding agents are believed to be suitable for this purpose, but epoxy—particularly an epoxy having a high coefficient of thermal expansion and being highly electrically insulating—is desirable. One particular epoxy that has been used to advantage is an epoxy manufactured by Armstrong having a two-part resin ("A-2") with a "W" type activator. Thus, the epoxy 50 is applied to both the metal wheel 42 and the ceramic ring 46 to substantially fill the gap therebetween and bond the two pieces together. The epoxy is preferably curable (block 24) at standard temperature and pressure for a period of twenty-four hours.

Once the ceramic ring 46 and metal wheel 42 are adjoined by the cured epoxy 50, the perimeter 52 of the ceramic ring is machined by diamond grinding to achieve a precise surface finish in the range of 32 to 64 rms (block 26). The perimeter 52 of the ceramic ring 46 is ultimately calibrated for precise determination of the length of wireline traveling over the ceramic ring. The sides of the combined metal wheel 42, epoxy ring 50, and ceramic ring 46 are also machined by grinding to achieve a smooth, flush side finish (block 28).

The machining of the perimeter 52 of the ceramic ring 46 by diamond grinding also achieves a patterned surface finish at the perimeter of the ceramic ring (block 30), as shown in FIG. 6. Various patterns may be implemented, but the diagonal pattern illustrated has proved to be advantageous in reducing slippage between a wireline and the ceramic-lined measuring wheel 40.

In a presently preferred embodiment, the inventive manufacturing method 10 further includes the step of adding a wear indicator 54 to the perimeter 52 of the ceramic ring 46 (block 30). The step of adding the wear indicator includes the forming at least one groove—and preferably three grooves—extending across the perimeter 52 (i.e., the width) of the ceramic ring 46. The groove(s) have a depth corresponding to acceptable wear of the ceramic ring 46, and are substantially parallel to the axis 41 of the ceramic ring. A dye, such as a permanent ink, is applied to the bottom of the each groove 54, such that wear of the ceramic ring 46 exceeding the depth of the groove will be indicated by the elimination of the dye. In a particularly preferred embodiment, the depth of each groove 54 is approximately 0.010 inches and the groove is approximately 0.125 inches wide. Since each groove 54 extends across the perimeter 52 of the ceramic ring 46, the width of each groove substantially matches the width of the measuring wheel 40. When three such grooves 54 are formed across the perimeter of ceramic ring, as shown in FIG. 4, the grooves are formed 120 degrees apart.

The present invention further provides a measuring wheel 40 for use in wireline operations. As otherwise described above, the inventive measuring wheel includes a metal wheel 42 having an outer radius defining a perimeter at 44, and a ceramic ring 46 having an inner radius that exceeds the metal wheel's outer radius by an amount in the range of 0.005 to 0.010 inches, and more preferably 0.006 to 0.007 inches. This difference between the outer radius of the metal wheel and the inner radius of the ceramic ring defines a gap between the ceramic ring and the metal wheel when the two are concentrically arranged. A suitable epoxy—particularly one having a high coefficient of thermal expansion and being highly electrically insulating—is disposed in the gap for adjoining the ceramic ring to the metal wheel.

The ceramic ring 46 has a perimeter at 52 whose surface employs a patterned machined finish for improving the frictional engagement between the perimeter of the ceramic ring and a wireline. The perimeter 52 of the ceramic ring further employs at least one wear indicator 54 for indicating when the measuring wheel 40 is spent and should be refurbished.

In a particular embodiment, the wear indicator 54 of the ceramic ring 46 includes at least one groove having a depth corresponding to acceptable wear of the ceramic ring and being substantially parallel to the axis 41 of the ceramic ring 46. It is preferred that a dye, such as a permanent ink, be applied to the bottom of the groove, such that wear of the ceramic ring exceeding the depth of the groove will be indicated by the elimination of the dye.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of manufacturing a measuring wheel for wireline operations, comprising the steps of:
   machining the perimeter of a disk-like metal wheel to achieve a first outer radius;
   positioning the metal wheel within a ceramic ring having an inner radius that exceeds the first outer radius by an amount in the range of 0.005 to 0.010 inches, defining a gap between the ceramic ring and the metal wheel;
   substantially filling the gap with an epoxy;
   curing the epoxy to adjoin the ceramic ring to the metal wheel; and
   machining the perimeter of the ceramic ring to achieve a second outer radius.

2. The method of claim 1, wherein the metal wheel is part of a spent measuring wheel.

3. The method of claim 2, wherein the first outer radius is achieved by machining the perimeter of the spent measuring wheel part to eliminate nonuniform areas produced by wear.

4. The method of claim 3, wherein the first outer radius is achieved by machining the perimeter of a spent measuring wheel part to reduce its outer radius by an amount in the range of 0.060 to 0.100 inches.

5. The method of claim 1, wherein the step of machining the perimeter of a metal wheel achieves a surface finish at the perimeter of the metal wheel in the range of 32 to 125 rms.

6. The method of claim 1, wherein the ceramic ring includes one of zirconium oxide, aluminum oxide, and silicon nitride.

7. The method of claim 1, wherein the epoxy is electrically insulating and has a relatively high coefficient of thermal expansion.

8. The method of claim 1, wherein the epoxy is cured at standard temperature and pressure for a period of twenty-four hours.

9. The method of claim 1, wherein the step of machining the perimeter of the ceramic ring achieves a surface finish at the perimeter of the ceramic ring in the range of 32 to 64 rms.

10. The method of claim 1, wherein the step of machining the perimeter of the ceramic ring achieves a patterned surface finish at the perimeter of the ceramic ring.

11. The method of claim 1, further comprising the step of adding a wear indicator to the perimeter of the ceramic ring.

12. The method of claim 11, wherein the step of adding the wear indicator includes the steps of:
    forming at least one groove across the perimeter of the ceramic ring, the groove having a depth corresponding to acceptable wear of the ceramic ring and being substantially parallel to the axis of the ceramic ring, and applying a dye to the bottom of the groove, such that wear of the ceramic ring exceeding the depth of the groove will be indicated by the elimination of the dye.

13. The method of claim 12, wherein the depth of the groove is approximately 0.010 inches.

14. The method of claim 12, wherein the groove is approximately 0.125 inches wide.

15. The method of claim 1, wherein the step of adding the wear indicator includes the steps of:
    forming at three grooves 120 degrees apart across the perimeter of the ceramic ring, the grooves each having a depth corresponding to acceptable wear of the ceramic ring and being substantially parallel to the axis of the ceramic ring, and
    applying a dye to the bottom of each of the grooves, such that wear of the ceramic ring exceeding the depth of the grooves will be indicated by the elimination of the dye.

* * * * *